United States Patent
Grimm

(10) Patent No.: US 9,745,966 B2
(45) Date of Patent: Aug. 29, 2017

(54) FLOATING SOLAR COLLECTOR ASSISTED OTEC GENERATOR

(71) Applicant: Charles M Grimm, Carmel, IN (US)

(72) Inventor: Charles M Grimm, Carmel, IN (US)

( * ) Notice: Subject to any disclaimer, the term of this patent is extended or adjusted under 35 U.S.C. 154(b) by 147 days.

(21) Appl. No.: 14/424,367

(22) PCT Filed: Aug. 12, 2013

(86) PCT No.: PCT/US2013/054455
§ 371 (c)(1),
(2) Date: Feb. 26, 2015

(87) PCT Pub. No.: WO2014/035643
PCT Pub. Date: Mar. 6, 2014

(65) Prior Publication Data
US 2015/0211497 A1    Jul. 30, 2015

Related U.S. Application Data

(60) Provisional application No. 61/849,927, filed on Feb. 5, 2013, provisional application No. 61/743,236, filed on Aug. 29, 2012.

(51) Int. Cl.
*F03G 7/05* (2006.01)
*F24J 2/06* (2006.01)
(Continued)

(52) U.S. Cl.
CPC .................. *F03G 7/05* (2013.01); *F01K 3/02* (2013.01); *F01K 7/16* (2013.01); *F01K 15/00* (2013.01);
(Continued)

(58) Field of Classification Search
CPC ................................ F03G 7/05; Y02E 10/34; Y02E 10/40–10/47; F24J 2/0461; F24J 2/0472; F24J 2/10; F24J 2/1023; F24J 2/24
(Continued)

(56) References Cited

U.S. PATENT DOCUMENTS 3,967,449 A    7/1976 Beck
4,079,726 A  *  3/1978 Voelker .................. F24J 2/0461
                                                                126/563
(Continued)

FOREIGN PATENT DOCUMENTS

CH   WO 2011106811 A2  *  9/2011 ............... F24J 2/125
CN        1673527 A         9/2005
(Continued)

OTHER PUBLICATIONS

International Search Report, PCT/US2013/054455, Nov. 14, 2013, Moscow, Russia. (7 pgs.).

*Primary Examiner* — Laert Dounis
(74) *Attorney, Agent, or Firm* — Brinks Gilson & Lione

(57) ABSTRACT

An Ocean Thermal Energy Conversion (OTEC) system having a turbine with an upstream side and a downstream side. Warm water under a partial vacuum is converted into a vapor, the vapor being supplied to the upstream side of the turbine at a pressure controlled by the temperature of the warm water. A condenser is situated on the downstream side of the turbine to cause the vapor, after passing through the turbine, to undergo a phase change back to a liquid, which can be used as potable water. The condenser is coupled to a source of a cooling liquid, and the pressure of the vapor on the downstream side of the turbine is determined by the temperature of the cooling liquid. A flexible floating solar collector supplies the warm liquid to the upstream side at a temperature higher than normal ambient temperature.

14 Claims, 6 Drawing Sheets

(51) Int. Cl.

| | |
|---|---|
| *F24J 2/52* | (2006.01) |
| *F24J 3/06* | (2006.01) |
| *F03G 6/00* | (2006.01) |
| *H02S 10/10* | (2014.01) |
| *F01K 3/02* | (2006.01) |
| *F01K 7/16* | (2006.01) |
| *F01K 15/00* | (2006.01) |
| *F01K 17/04* | (2006.01) |
| *F24J 2/00* | (2014.01) |
| *F24J 2/04* | (2006.01) |

(52) U.S. Cl.
CPC .............. *F01K 17/04* (2013.01); *F03G 6/003* (2013.01); *F24J 2/0007* (2013.01); *F24J 2/0472* (2013.01); *F24J 2/5267* (2013.01); *F24J 3/06* (2013.01); *H02S 10/10* (2014.12); *Y02E 10/34* (2013.01); *Y02E 10/46* (2013.01); *Y02E 10/47* (2013.01)

(58) Field of Classification Search
USPC .................................. 60/641.7; 126/561–714
See application file for complete search history.

(56) References Cited

U.S. PATENT DOCUMENTS

| | | | |
|---|---|---|---|
| 4,099,381 A | 7/1978 | Rappoport | |
| 4,132,222 A * | 1/1979 | Roark ................... | F24J 2/0488 126/657 |
| 4,189,924 A * | 2/1980 | LaCoste ................... | F03G 7/05 60/641.7 |
| 4,302,682 A * | 11/1981 | LaCoste ................... | B01D 3/06 203/11 |
| 4,350,143 A * | 9/1982 | Laing ........................ | C02F 1/14 126/567 |
| 4,360,004 A | 11/1982 | Testolini | |
| 4,374,814 A | 2/1983 | Gaylord | |
| 4,474,142 A * | 10/1984 | Bharathan ................ | F03G 7/05 122/40 |
| 4,475,535 A * | 10/1984 | Assaf ..................... | F24J 2/0466 126/568 |
| 4,504,362 A | 3/1985 | Kruse | |
| 4,622,949 A * | 11/1986 | Yahalom ................ | F03G 6/003 126/567 |
| 5,309,893 A | 5/1994 | Yeomans | |
| 5,445,177 A | 8/1995 | Laing et al. | |
| 5,513,494 A * | 5/1996 | Flynn ..................... | B01D 1/305 48/77 |
| 6,100,600 A | 8/2000 | Pflanz | |
| 7,642,450 B2 | 1/2010 | Connor | |
| 7,793,652 B1 | 9/2010 | Delgado | |
| 8,549,858 B2 * | 10/2013 | Tai ............. | F03G 6/06 60/641.14 |
| 8,821,602 B2 * | 9/2014 | McAlister ................ | F03G 6/00 423/648.1 |
| 2009/0223509 A1 | 9/2009 | Hoellenriegel et al. | |
| 2011/0061383 A1 * | 3/2011 | McAlister ............... | F03G 6/00 60/641.7 |
| 2012/0234668 A1 * | 9/2012 | King ..................... | F24J 2/0015 204/157.5 |
| 2012/0324888 A1 * | 12/2012 | Tiefenbacher .......... | F24J 2/125 60/641.15 |

FOREIGN PATENT DOCUMENTS

| | | | | |
|---|---|---|---|---|
| CN | 101196180 A | 6/2007 | | |
| CN | 101737282 A | 6/2010 | | |
| DE | 2828909 A1 * | 1/1980 | ................ | E04H 4/10 |
| FR | 2574910 A1 * | 6/1986 | ................ | F24J 2/243 |
| JP | 59046375 A * | 3/1984 | | |
| WO | WO 2008/042893 A2 | 4/2008 | | |

* cited by examiner

FLOATING SOLAR COLLECTOR ASSISTED OTEC GENERATOR

CROSS-REFERENCE TO RELATED APPLICATION

This application is related to and claims all benefit of U.S. Provisional Application Ser. No. 61/743,236 filed Aug. 29, 2012 and Ser. No. 61/849,927 filed Feb. 5, 2013.

BACKGROUND

Ocean Thermal Energy Conversion (OTEC) systems have been studied and small scale units have been tried since the late 1920's and early 1930's based on the principles of the Rankine Cycle developed in the mid-19th century. The systems involve a turbine having an upstream side and a downstream side. Warm liquid under a partial vacuum is converted into a vapor on the upstream side of the turbine with the vapor pressure being controlled by the temperature of the warm liquid. A condenser is situated on the downstream side of the turbine to cause the vapor, after passing through the turbine, to undergo a phase change back to a liquid. The condenser is coupled to a source of a cooling liquid, and the pressure of the vapor on the downstream side of the turbine is determined by the temperature of the cooling liquid. Small temperature differentials cause small pressure differentials which limit the effectiveness of the turbine.

To increase the temperature differential, OTEC systems are often located where deep water is available and temperature of the ocean surface is at its highest with the most hours of available sunlight. Typically, the most propitious sites are near the equator. To further increase the temperature differential, typical OTEC systems utilize water pulled up from extreme ocean depths of about 1000 meters as the cooling liquid. However, typical OTEC systems utilize about 80% of the energy that they can generate to pump warm surface water and to pump cooling water up from the extreme depths.

A typical prior-art land-based open loop OTEC system 10 is shown in FIG. 1 adjacent to a body of water. The system 10 has a warm water inlet 14 close to the surface 40 of the body of water, where the water typically has a temperature $t_2$ of approximately 27° C. A cold water inlet 12 is provided at a depth of approximately 1000 meters, where the water typically has a temperature $t_1$ of approximately 5° C. Warm water is brought in through inlet 14 and pumped into a warm water degassing tank 16. Air is pumped from the evaporation tank 18 by means of a vacuum pump 22 to achieve a partial vacuum. Degassed warm water is then pumped from the degassing tank 16 into the evaporation tank 18, which results in a portion of the degassed water flashing into steam, thus increasing the pressure in evaporation tank 18 to an initial pressure $P_1$. The steam is then fed into an upstream side of the turbine 26. The steam then passes through the turbine 26 to the downstream side of the turbine and into condenser 20. The condenser 20 is maintained at the temperature $t_1$ by virtue of being fed with the cold water being pumped by pump 24 up from cold water inlet 12. Condensation of the steam in condenser 20 causes a drop in pressure in the condenser 20 and on the downstream side of turbine 26 to an exhaust pressure $P_2$, which is lower than the initial pressure $P_1$. The pressure difference $\Delta P = P_1 - P_2$ causes the flow of steam through the turbine 26 causing the turbine 26 to spin. Turbine 26 then drives electricity generator 28. Water in the form of the condensed steam can be withdrawn from condenser 20 and stored in a tank 30 for use as potable or distilled water. The electricity generator 28 can be connected to a suitable grid 42 for distribution and use.

Major difficulties have prohibited prior art OTEC systems from achieving commercial success. A first difficulty lies in deploying and maintaining a large pipe 10 meters in diameter and 1000 meters deep against the shedding currents typically found in the ocean. A second difficulty lies in the inherent inefficiencies of typical systems. An analysis of the Carnot efficiency with the temperature change $\Delta t = t_2 - t_1$ of 20° C. shows that the very best a system could achieve is around 7% efficiency. In practice, with low pumping pressure differentials $\Delta P$ between the turbine inlet and outlet (approximately 0.4 psi), pumping losses, and small $\Delta t$'s, current OTEC systems run between about 1% and 2% efficiency.

Another problem for many of the systems attempted to date is that they are land-based systems where the deep ocean cold water had to be pumped not only up from the depths but it also had to be pumped a considerable lateral distance to reach the onshore plant which causes pressure losses and warming of the cooling water. Ocean front land can be prohibitively expensive and often are at risk due to hurricanes. Areas of highest temperature differential (equatorial Atlantic Ocean) are not close to areas requiring large quantities of energy. Bio-fouling of the entire system has also caused major failures in the past.

What is needed is alternative apparatus that can effectively and efficiently utilize the natural temperature differentials exhibited by selected areas of the ocean to generate a consistent level of usable power.

SUMMARY

OTEC systems of the present design can take the form of a system that can include a large flexible floating solar collector coupled to the warm water inlet. The solar collector can supply large volumes of very hot water (approximately 80°-85° C.) to the evaporator—steam generator, which reduces the amount of water needed to provide a desired quantity of steam. The increased inlet temperature improves the Carnot efficiency to about 21% with a $\Delta t$ of 73° to 78° C.

OTEC systems of the present design can take the form of a system that can include a cooling water inlet that is located at or near to the surface of the ocean water rather than at a large depth. Using surface ocean water instead of the deep ocean water for cooling the condenser eliminates the need for the deep water pipe and only reduces the Carnot efficiency to approximately 17% with a $\Delta t$ of 53° to 58° C.

Building the evaporator and condenser segments of the OTEC system of the present design, along with placing the generator turbine onboard a ship, and attaching the large flexible floating solar collectors to surround the ship, minimizes the pumping distance and therefore the efficiency losses due to pressure losses and thermal losses. A large insulated floating pool can be added in which hot water can be deposited from the solar collectors during the day, and then withdrawn during the evening and night time hours, to keep the generator ship functioning 24/7.

Additionally, OTEC systems of the present design no longer need to be located on the equator to get the maximum $\Delta t$'s to improve the efficiencies. Now with a system improved with the solar collector water heaters, an OTEC system can be efficiently installed anywhere with water that does not freeze and with significant sunlight. If the system is onboard a ship it also can be moved to avoid inclement weather.

Other features and advantages of the present OTEC system and the corresponding advantages of those features will become apparent from the following discussion of preferred embodiments, which is illustrated in the accompanying drawings. The components in the figures are not necessarily to scale, emphasis instead being placed upon illustrating the principles of operation. Moreover, in the figures to the extent possible, like referenced numerals designate corresponding parts throughout the different views.

DESCRIPTION OF PREFERRED EMBODIMENTS

Figure 1:
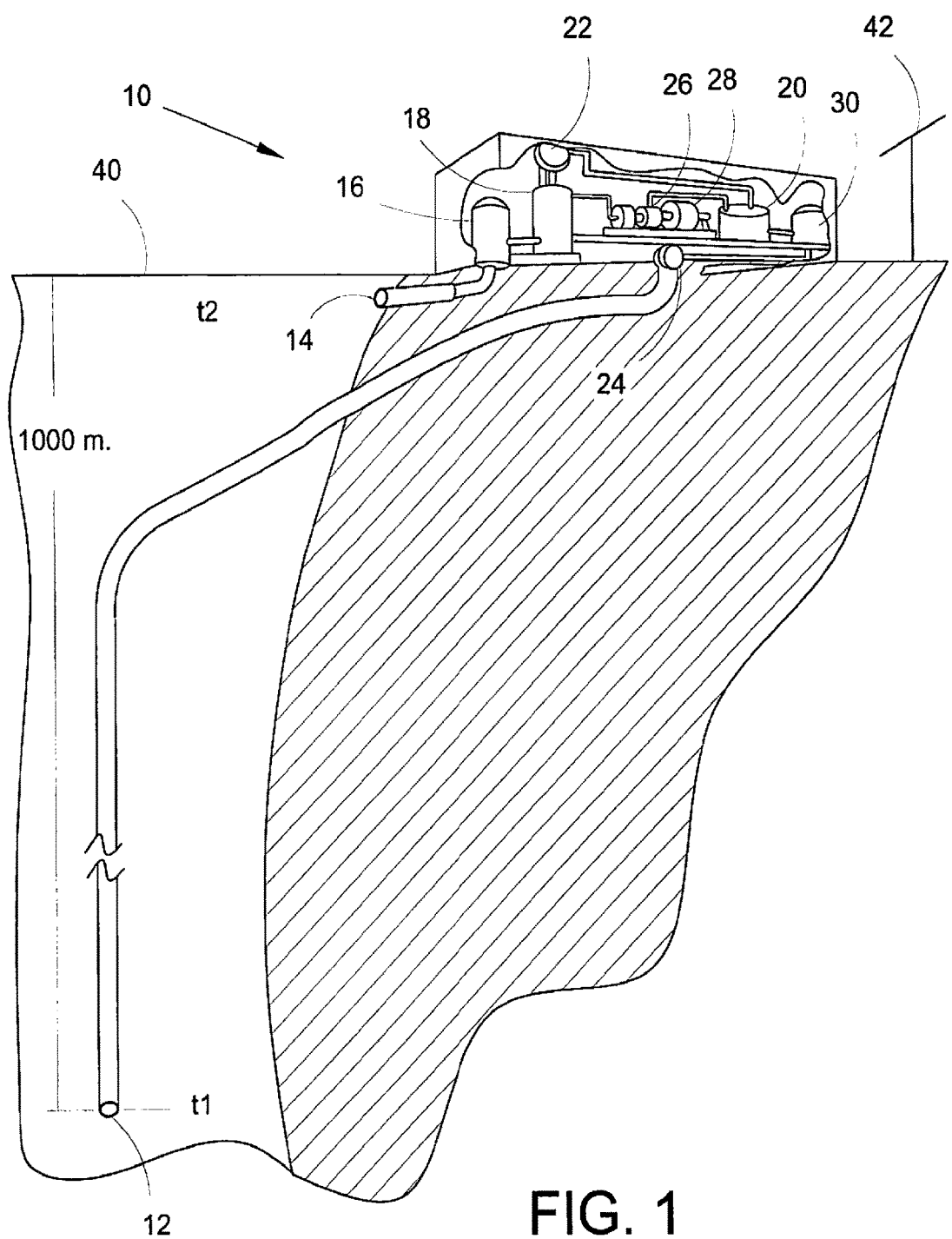
FIG. 1 is a schematic view of a typical prior art land-based OTEC facility.
Figure 2:
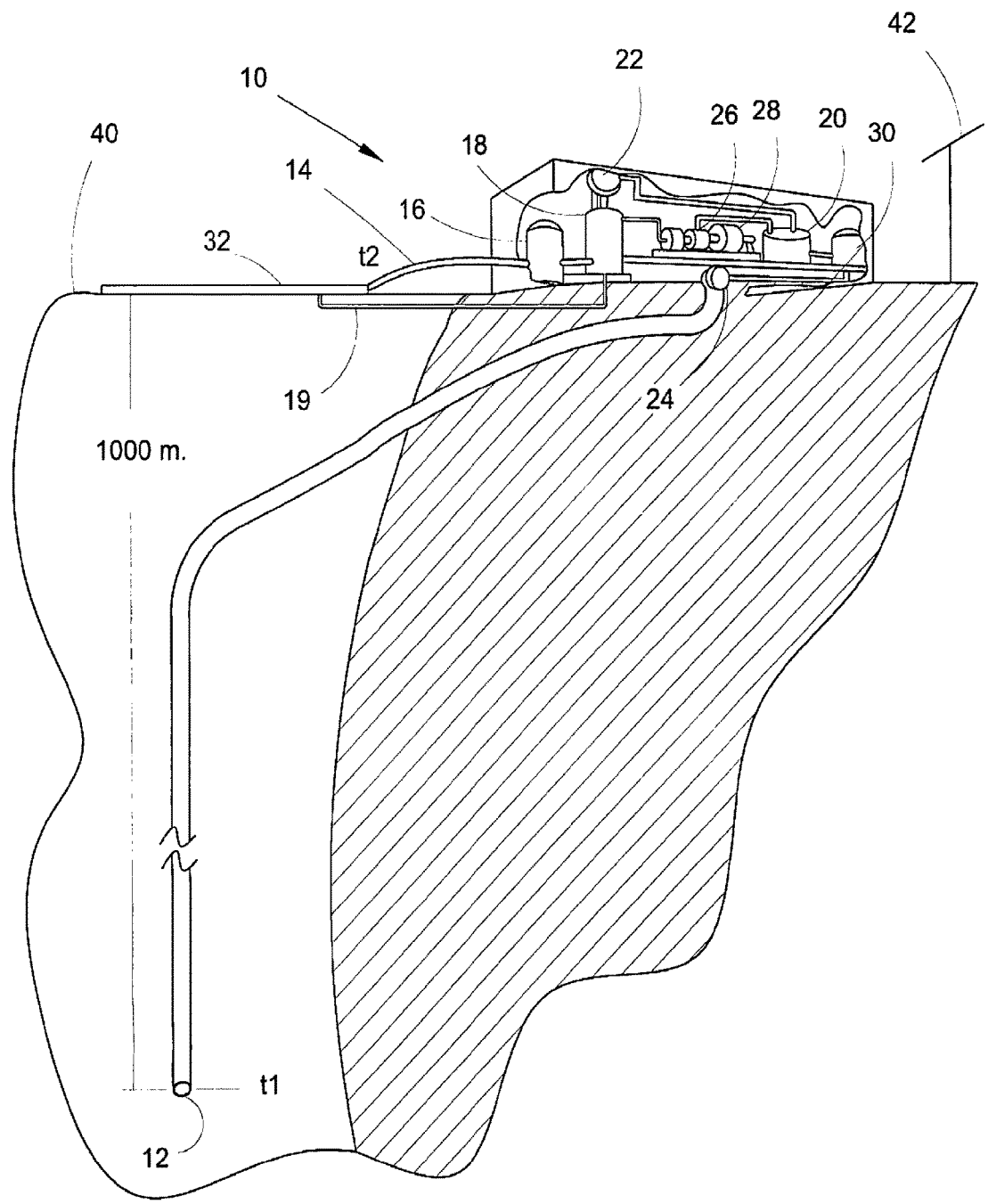
FIG. 2 is a schematic view of a land-based OTEC facility of the present design having a floating solar collector/heat exchanger.

FIG. 2 shows a first embodiment of an OTEC facility of the present design that can include one or more large floating solar collectors 32. The solar collectors 32 are designed to heat the water introduced into the warm water inlet 14 to a temperature $t_2$ that exceeds the surface temperature of the adjacent body of water 40. The floating solar collectors 32 can be constructed inexpensively, for example, by seaming at least two layers of a plastic material together to form a buoyant support for a pipe connected to the warm water inlet 14. In the embodiment shown in FIG. 2, the condenser 20 is maintained at the temperature $t_1$ by virtue of being fed with the cold water being pumped by pump 24 up from cold water inlet 12 just as in the prior art shown in FIG. 1. This higher temperature $t_2$ for the water going into water inlet 14 translates into a greater Δt than that present in the prior art discussed in connection with FIG. 1. Additionally, as the water is introduced into the evaporation tank 18 to form the steam, the water that is not converted into steam, typically representing 90% or more of the introduced volume, can be recirculated to the solar collectors 32 through recirculation pipe 19. The temperature of the recirculated water has been cooled by the steam evaporation process, but is still warmer than the surface sea water, thereby reducing the amount of solar energy required to achieve the desired temperature $t_2$. This recirculation also reduces the energy used to degas the water incoming to the degassing tank 18 by as much as seven fold as at least part of the incoming water has been through the degassing process previously.

Figure 3:
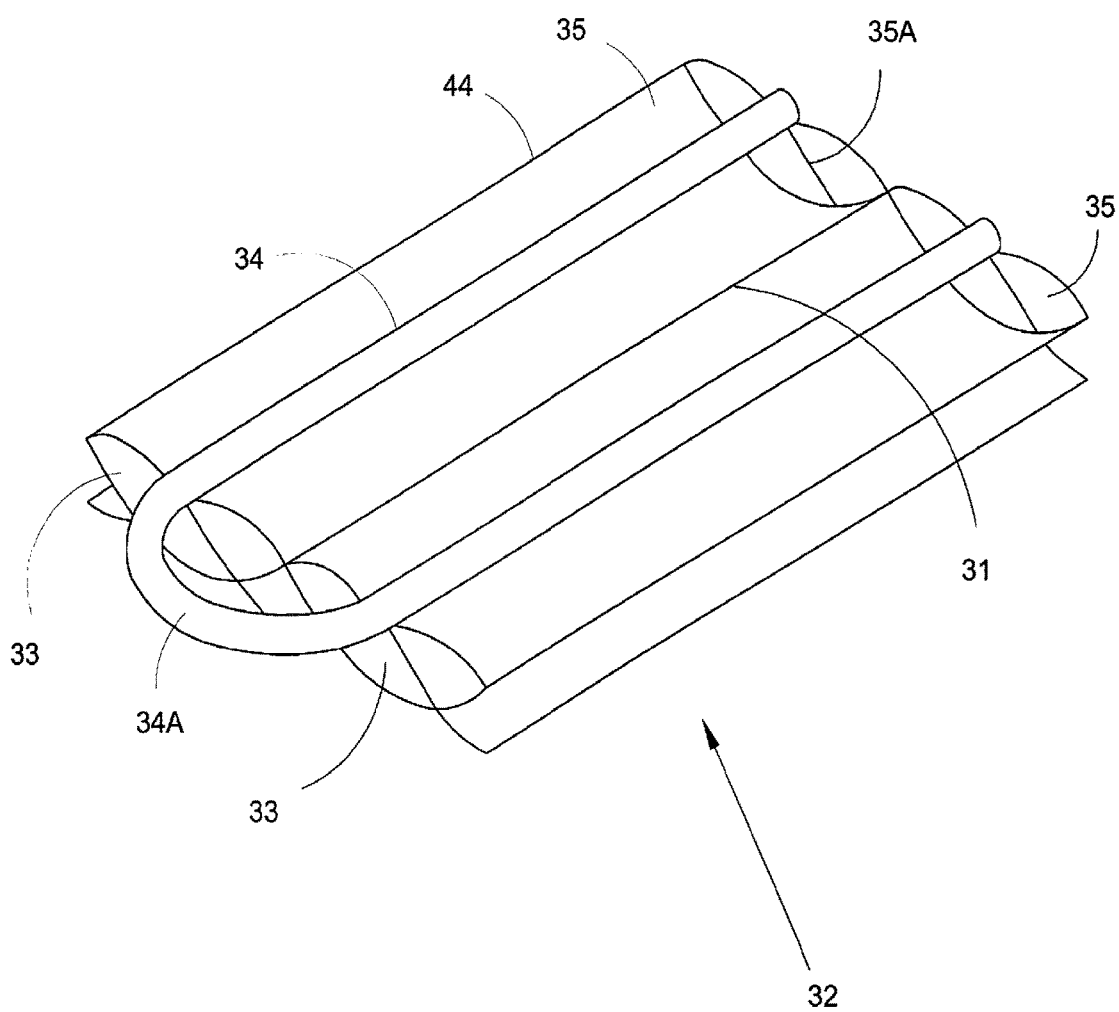
FIG. 3 is a schematic view of a flexible floating solar collector/heat exchanger of the present design.

In one embodiment, the solar collectors 32 can take the form of a flexible floating solar collector shown in FIG. 3 to be constructed of a plurality of reflective sheets 33 coupled adjacent to each other along a joining seam 31. A transparent or translucent covering member 35 can also be connected to the edges of the reflective sheets 33 along seams 31. The space between the reflective sheets 33 and the covering members 35 can be filled with a lighter than water material, such as air, to maintain the reflective surfaces in an approximately parabolic trough-like configuration. Additional intermediate webs 35A can also be included to provide enhanced structural relations between the reflective sheets 33 and the covering members 35. A pipe 34, which is preferably black or other light absorbing color or texture, can be fixed to a middle portion of the covering member 35 so as to be positioned at an optimum position relative to the reflecting curved surfaces 33 of collector 32 to reflect sunlight to the pipe 34. The pipe 34 can include curved intermediate portions 34A so as to form a serpentine pattern mounted at the optimum point in the adjacent covering members 35. Preferably, the reflective sheets 33 focus approximately 60% of the available sunlight falling on the collector 32 on pipe 34. Multiple flexible floating collectors 32 can be arranged together such that if one solar collector 32 has maintenance problems of any kind it can be taken off line without affecting the flow of heated water from the remaining functional solar collectors 32.

Pipe 34 can have an outlet end coupled to warm water inlet 14. An inlet end opposite the outlet end of pipe 34 can simply be place into the surrounding body of water 40 adjacent to water surface, and can also be coupled to recirculation pipe 19. The water not converted to steam in the evaporator 18 can be at an elevated temperature relative to the surrounding environment (typically, approximately 58° C.). Recycling this water through recirculation pipe 19 can provide additional efficiencies as it is already "preheated" and degassed, and the solar heating of this water to the desired output temperature in the range of 80° to 85° C. can occur more quickly. Water pumped through pipe 34 can be heated by the incident sunlight to temperatures in the range of 80° to 85° C. with simple horizontal solar tracking. The heated water can be delivered to the evaporator 18 where the heated water becomes steam at a reduced pressure $P_1$ of approximately 8.4 psi. This reduced pressure steam then flow through the turbine 26 into the condenser 20. The pressure $P_2$ in the condenser 20 drops to about 0.5 psi as the steam condenses back to water. The difference in pressure ΔP between the evaporator 18 and the condenser 20 ensures the desired flow of steam through the turbine 26. The comparatively higher pressure of steam on the inlet side of turbine 26 coupled with the lower pressure on the outlet side of turbine 26 causes turbine 26 to spin. This twenty-fold increase in pressure differential ΔP as compared to previously discussed prior art device can cause the turbine 26 to drive the electricity generator 28 at a much higher rate and with greater overall efficiency.

Figure 4:
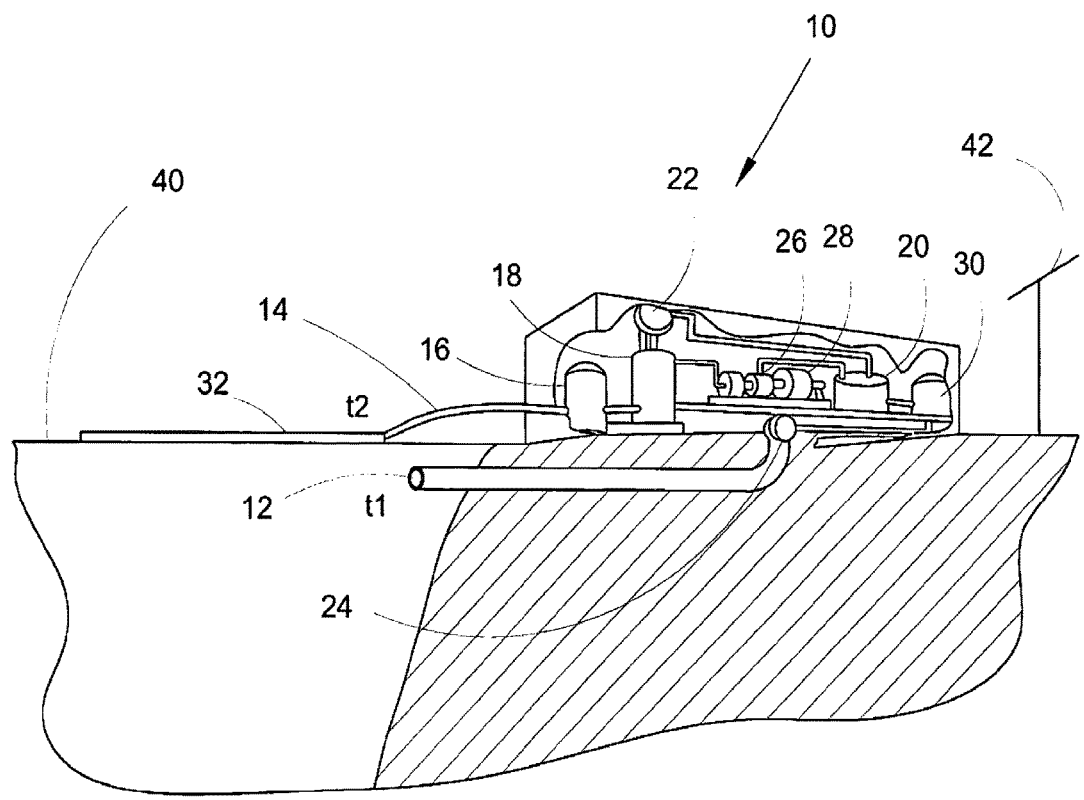
FIG. 4 is a schematic view of a land-based OTEC facility of the present design having a floating solar collector/heat exchanger and a near surface cooling water intake.

The embodiment shown in FIG. 4 eliminates the deep water pipe and all of the deep water maintenance of that pipe, the location restrictions, the cost for pumping that much cold water from the depths, the thermal losses as the temperature of the cold water warms as it is brought to the surface. The input 12 for the water fed to the condensers 20 is, in this embodiment, situated adjacent to the surface 40 of the adjacent body of water, which is typically about 27° C. The warmer water obtained from this surface position typically only causes a 4% drop in Carnot efficiency from about 21% to about 17%. The embodiment shown in FIG. 4 provides a Δt ($t_1-t_2=58°$ C.) between the warm water temperature from a plurality of solar collectors 32 (t1=85° C.) and the cooling water temperature (t2=27° C.) for the condensing liquid from the surface of water body 40. The Δt provided by FIG. 4 is greater than the Δt provided by the prior art, FIG. 1, which is $\Delta t = t_2 - t_1$ of 22° C., where $t_1$ is the temperature of the warm water from the surface 40 of the adjacent body of water ($t_1 = 27°$ C.) and $t_2$ is the temperature of the condensing liquid drawn from the deep water draws at a temperature of about 5° C.

Figure 5:
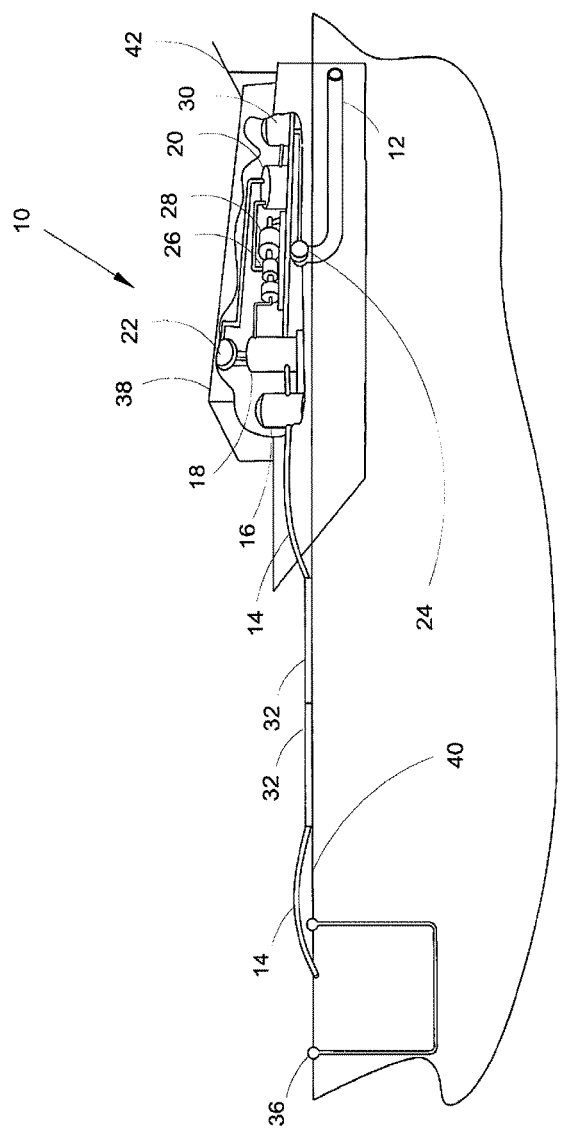
FIG. 5 is a schematic view of a ship-based OTEC facility of the present design having a floating solar collector/heat exchanger and a near surface cooling water intake.

Another embodiment, shown in FIG. 5, can include a large floating hot water tank 36 in which to store hot water collected from the solar collectors 32 during the day light hours, and tapped during the evening and night time hours, thus allowing a 24/7 operating schedule. Additional solar collectors 32 can be added to fill hot water tank 36 while the remainder of the solar collectors 32 are supplying the hot water to the steam generator 18. A 50 foot by 50 foot cubic water tank 36 would hold about one million gallons of hot water. In a 27° C. ocean, such a tank 36 full of water would cool from approximately 85° C. to about 80° C. in approximately 12 hours, thus potentially providing a source of solar heated water for round-the-clock operation. This embodiment also can comprise a floating transportable support 38, such as a ship or barge, with an evaporator 18, turbine 26, generator 28 and condenser 20 onboard, and with a plurality of large flexible floating solar collectors 32 attached to and surrounding the floating transportable support 38. Floating hot water storage tank 36 can be attached to, or an integral part of the floating transportable support 38 as well. The temperature of the water within the floating hot water storage tank 36 can be monitored relative to the outlet of the floating solar collector 32. Water can be withdrawn from the floating hot water storage tank 36 at any time the temperature of the water in the storage tank 36 exceeds the temperature at the outlet of the solar collector 32

This embodiment also employs a means 42 to distribute the electricity generated to receiving stations on shore but is movable and thus could avoid threatening weather. For example, the means 42 can comprise one or more undersea power cables, each having a first end connected to a land-based power distribution network and a second end supported by a buoy at desired locations in the ocean. The system, supported by floating transportable support 38, can be positioned to connect to one of the buoy-supported second ends of an undersea power cable so that the power produced by the system shown in FIG. 5 can be utilized on shore.

Figure 6:
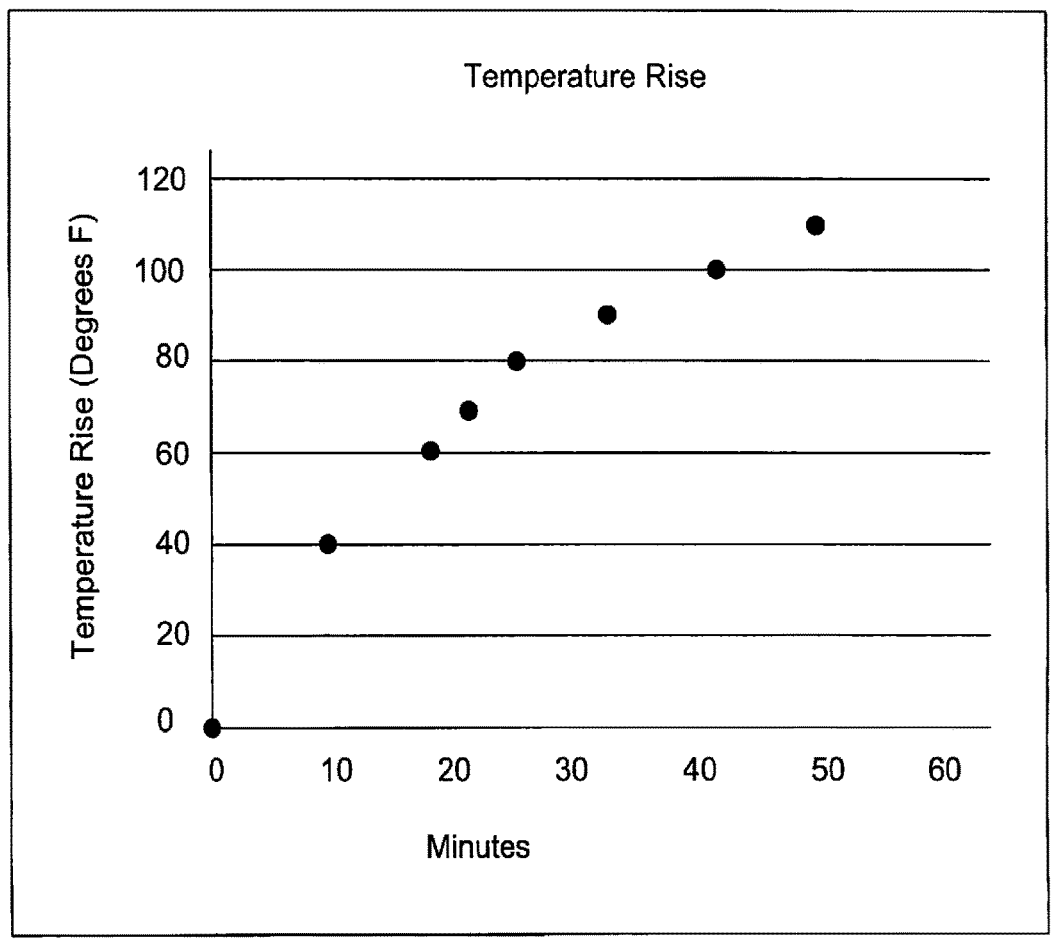
FIG. 6 is a graph of a measured temperature rise in a demonstration solar collector similar to FIG. 3.

FIG. 6 is a graph of a measured temperature rise in a demonstration solar collector similar to FIG. 3. The demonstration solar collector employed pipe 34 composed of black single-walled HDPE corrugated pipe of outside diameter of about 5 cm. The pipe 34 was centrally positioned above a forty centimeter wide reflector 32 having a total area of 1.98 m². The ambient temperature of the air and water at the start of the test shown in FIG. 6 was 27° C. After 49 minutes of exposure to sunlight, the temperature of the water within the pipe 34 had risen to 88° C. Scaling such a solar heat exchanger up, a solar collector of about one hectare would contain slightly over 27 kL of water. If the water in such a system circulated at a flow rate of slightly over 9 L/second, the round trip time for the water would be the 49 minutes used in the reported test, which would be sufficient time for the water to gain nearly 60° C. with each trip and delivering the gained heat to the steam generator 18.

The descriptions in the above specification are not intended to limit this invention to the materials disclosed here. Rather, they are shown for illustration purposes only as one skilled in these arts could easily scale the invention's dimensions and materials to work with any size OTEC system from small to very large, from around 10 kilowatts to more than a gigawatt. Open loop systems produce steam for power generation and then condense the steam, producing large amounts of distilled water. Small versions of this system will be easily deployable to any coastal site, providing electric power and fresh water to any coastal site in emergency situations. Small systems could be used to supply water and power to remote locations, like oil rigs or small islands. No fossil fuels would need to be transported. A ten megawatt plant would produce more than 1 million gallons of distilled water per day, which could actually be worth more than the power generated in some areas of the world.

While these features have been disclosed in connection with the illustrated preferred embodiments, other embodiments of the invention will be apparent to those skilled in the art that come within the spirit of the invention as defined in the following claims.

The invention claimed is:

1. An Ocean Thermal Energy Conversion (OTEC) system comprising: a turbine with an upstream side and a downstream side, the turbine being mechanically coupled to a power generator, a converter connected to the turbine upstream side, the converter having a warm water inlet and a source of a partial vacuum, a condenser coupled to the downstream side of the turbine, the condenser having an outlet and a source of a cooling liquid, a floating solar collector coupled to the warm water inlet of the converter wherein the floating solar collector comprises at least two layers of a plastic material seamed together to form a buoyant support, and a pipe supported by the buoyant support, the pipe connected to the warm water inlet of the converter and wherein a lower layer of the plastic material of the buoyant support has an upwardly directed curved reflective surface maintained in a trough-like configuration; and a dispensary of potable water coupled to the outlet of the condenser; and a hot water storage tank having an inlet coupled to an outlet of the solar collector and an outlet coupled to the warm water inlet of the converter, the inlet of the hot water storage tank configured to receive a portion of water supplied by the floating solar collector and the outlet of the hot water storage tank configured to selectively deliver water to the warm water inlet of the converter.

2. The OTEC system of claim 1, wherein the pipe is positioned at a central location above the trough-like configuration.

3. The OTEC system of claim 2, wherein an upper layer of the plastic material of the buoyant support is transparent and fixed above the upwardly directed reflective surface, the pipe being fixed to the upper layer to maintain a relation between the pipe and the trough-like configuration of the upwardly directed reflective surface.

4. The OTEC system of claim 1, further comprising a recirculation pipe connected to the converter and to the floating solar collector for recirculating water not converted to steam within the converter to the solar collector for reuse.

5. The OTEC system of claim 1, wherein the source of cooling liquid is adjacent a surface of a body of water upon which the solar collector floats.

6. A method of operating an Ocean Thermal Energy Conversion (OTEC) system, the system including a turbine with an upstream side and a downstream side, the turbine being mechanically coupled to a power generator, a converter connected to the turbine upstream side, the converter having a warm water inlet and a source of a partial vacuum, a condenser coupled to the downstream side of the turbine, the condenser having an outlet and a source of a cooling liquid, and a floating solar collector coupled to the warm water inlet of the converter, the method comprising the steps of:

heating water present in the floating solar collector to a temperature above the ambient temperature of the surrounding environment by concentrating solar energy onto a pipe positioned above a curved reflective surface;

transferring the heated water from the solar collector to the converter;

subjecting the transferred heated water to the source of partial vacuum to draw off steam having a desired initial temperature and pressure;

allowing the steam to travel through the turbine from the upstream side to the downstream side;

subjecting the steam having passed through the turbine to the condenser to cause at least a portion of the steam to form a condensate, any remaining steam being at a temperature and pressure lower than the initial temperature and pressure;

withdrawing any power generated by the generator as the steam travels through the turbine;

withdrawing at least a portion of the condensate for consumption as potable water;

supplying hot water to a hot water storage tank from an outlet of the floating solar collector;

introducing water from the storage tank to the converter;

monitoring the temperatures of the water in the storage tank and at the outlet of the floating solar collector; and introducing water from the storage tank to the converter in response to the temperature of the water in the storage tank exceeding the temperature at the outlet of the floating solar collector.

7. The method of operating an OTEC system of claim 6, further comprising the step of:

recirculating at least a portion of the water from the converter to the solar collector for reuse.

8. The method of operating an OTEC system of claim 6, further comprising the step of:

situating the source of the cooling liquid adjacent a surface of a body of water in which the solar collector floats.

9. The method of operating an OTEC system of claim 6, further comprising the steps of:

providing at least one undersea power cable, having a first end connected to a land-based power distribution network and a second end supported by a buoy at desired locations in the ocean; and coupling the second end of the power cable to at an outlet of the power generator.

10. The method of operating an OTEC system of claim 6, further comprising the steps of:

seaming at least two layers of a plastic material together to form a buoyant support, and positioning a pipe on the buoyant support to connect to the warm water inlet of the converter.

11. The method of operating an OTEC system of claim 10, further comprising the steps of:

providing a lower layer of the plastic material of the buoyant support with an upwardly directed curved reflective surface maintained in a trough-like configuration; and positioning the pipe supported by the buoyant support at a central location above the trough-like configuration.

12. The method of operating an OTEC system of claim 11, further comprising the steps of:

fixing a transparent upper layer of the plastic material of the buoyant support above the upwardly directed reflective surface, and securing the pipe to the transparent upper layer to maintain a relation between the pipe and the trough-like configuration of the upwardly directed curved reflective surface.

13. The OTEC system of claim 1, further comprising curved intermediate portions coupled to the pipe so as to form the pipe into a serpentine pattern between the water inlet and water outlet.

14. The OTEC system of claim 1, wherein the temperature of the water at the warm water inlet of the converter is between 80 degrees Celsius and 85 degrees Celsius.

* * * * *